United States Patent
Minami et al.

[15] 3,673,184
[45] June 27, 1972

[54] CERTAIN 2-SUBSTITUTED-5,8-DIHYDRO-5-OXOPYRIDO[2,3-D]PYRIMIDINE-6-CARBOXYLIC ACID DERIVATIVES

[72] Inventors: Shinsaku Minami, Kouriyama; Toshihiro Shono, Takatsuki; Masanao Shimmizu, Kobe; Yoshiyuki Takase, Amagasaki, all of Japan

[73] Assignee: Dainippon Pharmaceutical Co., Ltd., Osaka, Japan

[22] Filed: Sept. 2, 1970

[21] Appl. No.: 68,558

Related U.S. Application Data

[63] Continuation of Ser. No. 577,803, Sept. 8, 1966, abandoned.

[52] U.S. Cl. ............260/247.2 R, 260/247.2 B, 260/256.4 F, 260/256.4 C, 260/256.4 N, 260/256.5 R, 260/482 P, 260/484 P, 260/534 E, 260/535 P, 424/251
[51] Int. Cl. ..............................................C07d 57/20
[58] Field of Search ............260/256.4 F, 256.5 R, 247.2 R, 260/247.2 B

[56] References Cited

UNITED STATES PATENTS 3,322,765  5/1967  Hitchings et al. ..................260/256.4

OTHER PUBLICATIONS

Mulvey et al., Chem. Abstracts, 61:13306c (1964)

*Primary Examiner*—Alex Mazel
*Assistant Examiner*—R. J. Gallagher
*Attorney*—Sherman and Shalloway

[57] ABSTRACT

A 5,8-dihydro-5-oxopyrido [2,3-d] pyrimidine derivative represented by the following formula
0002

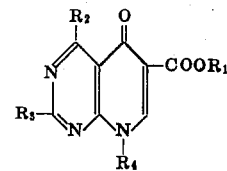

wherein $R_1$ stands for hydrogen or a lower alkyl radical; $R_2$ stands for hydrogen, a lower alkyl radical, hydroxyl group, a halogen atom, a lower alkoxy radical, an amino radical or a lower alkylthio radical; $R_3$ stands for hydrogen, a lower alkyl radical, hydroxyl group, a lower alkoxy radical, a lower alkylthio radical or a radical represented by the formula

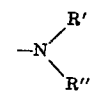

(wherein R' stands for hydrogen, an alkyl radical, a cycloalkyl radical, an amino radical, a hydroxyalkyl group or an alkyl substituted amino alkyl radical, and R'' stands for hydrogen or an alkyl radical, R' and R'' may be the same or a different radical and R' and R'' may bond together to form a 5- or 6-membered heterocyclic ring containing a nitrogen hetero atom); and $R_4$ stands for hydrogen or an alkyl group. Such derivatives are useful as antibacterial agents.

10 Claims, No Drawings

CERTAIN 2-SUBSTITUTED-5,8-DIHYDRO-5-OXOPYRIDO[2,3-D]PYRIMIDINE-6-CARBOXYLIC ACID DERIVATIVES

This is a continuation of Ser. No. 577,803, filed Sept. 8, 1966, now abandoned.

This invention relates to a novel compound having an antibacterial activity against Gram positive and Gram negative bacteria, its intermediate and process for the production thereof.

The compound of this invention has a high activity against important pathogenic bacteria, especially Gram negative bacteria such as Shigella, Salmonella and Klebsiella.

It can be expected that the compound will be useful in treatment of bacterial infections in man and animals. Also, the compound will be useful in the fields of foods and agriculture.

The novel compound of this invention of a 5,8-dihydro-5-oxopyrido [2,3-d] pyrimidine derivative is a compound represented by the following formula (IV).

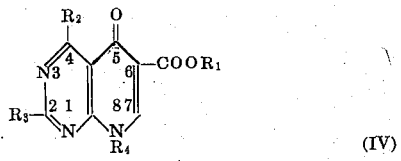
(IV)

wherein $R_1$ stands for hydrogen or a lower alkyl radical, $R_2$ stands for hydrogen, a lower alkyl radical, hydroxyl group, a halogen atom, a lower alkoxy radical, an amino group or a lower alkylthio radical, $R_3$ stands for hydrogen, a lower alkyl radical, hydroxyl group, a lower alkoxy radical, a lower alkylthio group or a radical represented by the formula

(wherein R' stands for hydrogen, an alkyl radical, a cycloalkyl radical, an amino radical a hydroxyalkyl radical or an alkyl-substituted aminoalkyl radical, R" stands for hydrogen or an alkyl radical, R' and R" may be the same or different, and R' and R" may bond together to form a heterocyclic ring), and $R_4$ stands for hydrogen or an alkyl radical.

A lower alkyl radical referred to herein directs to a straight chain or branched chain alkyl radical having 1-6 carbon atoms, while a lower alkoxy radical and a lower alkylthio radical referred to herein directs to an alkoxy radical and an alkylthio radical each having 1-6 carbon atoms corresponding to said lower alkyl radical.

Further, the compound of said formula (IV) sometimes forms an organic amine salt at the position of $R_1$, and the formula (IV) of this invention is defined as including such salts.

Of $R_2$, hydrogen, a lower alkyl radical, hydroxyl group and a halogen atom are preferable groups as compared with other $R_2$'s, and as an alkyl radical of $R_4$, a lower alkyl radical is preferable.

Heretofore, in the compound of this invention of said formula (IV), the following compound having different substituents at 5-position and 6-position, but having the same ring structure has been known as an antibacterial agent. Typical examples of these known compounds are the compound of the following formula described in Belgian Pat. No. 658,069, namely

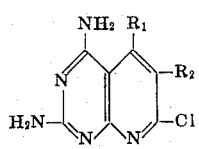

(wherein $R_1$ stands for an alkyl having 1–4 carbon atoms, $R_2$ stands for hydrogen or an alkyl or aralkyl having 1–4 carbon atoms, and $R_1$ and $R_2$ may bond to form a divalent alkylene bridge), the compound of the following formula described in Belgian Pat. No. 657,922, namely

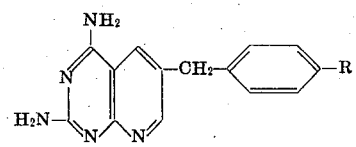

(wherein R stands for an alkoxy or an alkyl having 1–4 carbon atoms), and the compound of the following formula described in British Pat. No. 970,583, namely

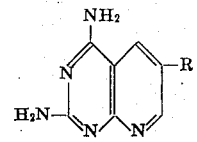

(wherein R stands for an alkyl, a phenalkyl or an alkyl-substituted phenyl).

The ring structure common to these known compounds are formed by similar means. For instance, when an explanation is made of the compound of said Belgian Pat. No. 657,992 as an example, such compounds are prepared by halogenating 3-tert. amino-acrolein of the following formula, namely

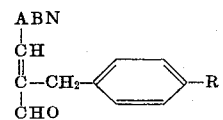

(wherein ABN is a tert. amino and R is an alkyl or alkoxy having 1–4 carbon atoms), and heating the halogenated 3-tert. amino-acrolein with 2,4,6-triaminopyrimidine.

The objective compound of this invention represented by said formula (IV) and the compound of following formula (III) which is an intermediate thereof of which mention will be made later in connection with an explanation about the process for the preparation are both novel compounds. The compound of formula (IV) is more excellent in that it shows a high anti-microorganism activity against many pathogenic microorganisms and the preparation thereof is easy.

Further, though the ring structure is different from that of the compound of this invention, in Belgian Pat. No. 612,258, a compound A of the following formula is described as an antibacterial agent having a high activity.

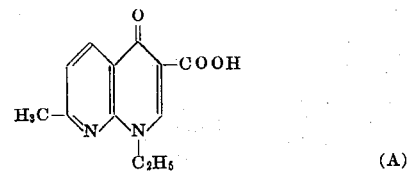
(A)

It is true that this compound is one of the excellent anti-bacterial agents; however it has lower in vitro antibacterial activity and more toxicity than the preferable compound of this invention. For instance, 6-carboxy-5,8-dihydro-2-dimethylamino-8-ethyl-5-oxopyrido [2,3-d] pyrimidine [compound (B)] and 6-carboxy-5,8-dihydro-8-ethyl-2-methylthio-5-oxopyrido [2,3-d] pyrimidine, both belonging to the compound of this invention, show excellent antibacterial activities against a broad range of pathogenic microorganisms as will be shown later in Table III, and MIC of said compound (B) is 10 mcg/ml against *staphylococcus aureus*, while that of the known compound (A) is 100 mcg/ml against the same organism.

Further, when the toxicity ($LD_{50}$) of said known compound (A) is compared with that of said compound (B), the results are as shown in Table I and it is understood that the composition of this invention is excellent in toxicity as compared with said known antibacterial agent.

TABLE I

Acute toxicity in mice

| | dose | (survived/tested) i.p. | p.o. |
|---|---|---|---|
| compound (A) | 1g/kg | 0/5 | 3/5 |
| compound (B) | 1g/kg | 4/5 | 5/5 |

Observation was made on 7th day after administration.

Accordingly, an object of this invention is to provide novel compounds having an excellent antibacterial activity.

Another object of this invention is to provide processes for the preparation of such compounds.

Further objects and advantages of this invention will become clearer from the following description.

Of the novel compound of this invention represented by the formula (IV), from the viewpoint of a broad scope of application and excellent medicinal effect, (i). a novel 5,8-dihydro-5-oxopyrido [2,3-d] pyrimidine of which $R_1$ is hydrogen and $R_4$ is an alkyl radical in the formula (IV) and (ii). a novel 5,8-dihydro-5-oxopyrido [2,3-d] pyrimidine of which $R_1$ and $R_4$ are hydrogen or a lower alkyl group and $R_3$ is a lower alkylthio radical or

[wherein R' and R'' are as defined in the formula (IV)] in the formula (IV) are two examples showing preferable compounds. In the latter case of (ii) when $R_1$ is hydrogen and $R_4$ is an alkyl radical, it becomes an embodiment wherein the case of (i) is further limited in respect of $R_3$.

Next, an explanation will be made about a process for the preparation of the novel compound having an antibacterial activity of this invention.

The novel compounds of this invention can be easily prepared by ring-closing upon heating intermediates of formula (III) to be mentioned later, which are novel compounds. An N-(6-pyrimidinyl) aminomethylene malonic acid derivative of formula (III) can be prepared by two methods, and when they are mentioned together, they are as follows.

(Method *a*)

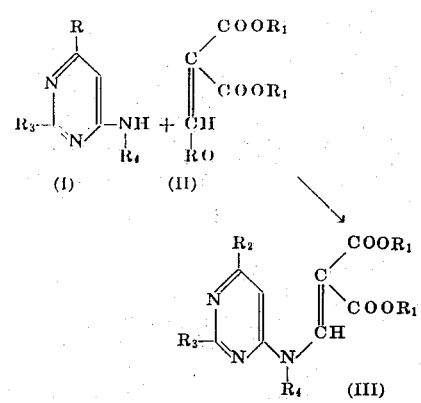

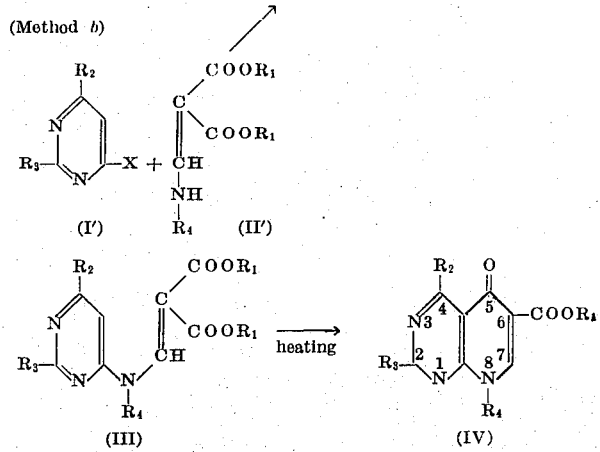

(wherein $R_1$, $R_2$, $R_3$ and $R_4$ are as defined in the formula (IV), R stands for a lower alkyl and X stands for a halogen atom).

Namely, in order to obtain the novel compound (IV) of this invention, one may be obtained by the reaction of an aminopyrimidine derivative represented by formula (I) with an alkoxymethylene malonic acid derivative represented by formula (II) (Method *a*), or the reaction of a halogenopyrimidine derivative represented by formula (I') with an aminomethylene molonic derivative represented by formula (II') (Method *b*) to form the novel intermediate of formula (III) and heating to ring-close said compound of formula (IV).

The reaction of method *a* may be carried out as follows. The object of Method *a* can be achieved by heating the compound of formula (I) and the compound of formula (II) per se or in an inert solvent such as alcohols or dioxane. The reaction temperature is 80°–150° C., preferably 100°–130° C.

The reaction of Method *b* may be carried out as follows. The compound of formula (I') and the compound of formula (II') are heated in a sealed tube. This reaction may also be carried out in the absence of a solvent; however, preferably it is better to carry out the reaction in an inert solvent such as alcohols or dioxane. As the reaction temperature, a temperature within the range of from 80° to 150° C. is preferably selected.

The obtained N-(6-pyrimidinyl) aminomethylene malonic acid derivative of formula (III) is a novel compound, which can be converted into a 5,8-dihydro-5-oxopyrido [2,3-d] pyrimidine of formula (IV) easily by heating which brings about a ring closure reaction.

The ring closure reaction of the intermediate of formula (III) to the compound of formula (IV) may be carried out in the absence of a solvent; however, preferably it is carried out in the presence of an inert organic solvent such as ethylene glycol monoalkyl ether, diphenylether and a mineral oil under heating conditions. As said inert organic solvent, those having a boiling point in the vicinity of the reaction temperature are preferable. It is better to carry out the reaction using such a solvent under refluxing conditions. As the reaction temperature, a broad range of from a considerably low temperature to a high temperature can be adopted; however, normally a temperature of 100°–300° C., preferably a temperature in the vicinity of 250° C. is adopted.

The obtained reaction product may be purified by recrystallization according to the conventional method using, as occasion demands, a proper solvent such as, for instance, methanol, ethanol, chloroform, butanol and acetone.

When in the obtained novel compound shown by formula (IV), 5,8-dihydro-5-oxopyrido [2,3-d] pyrimidine derivative, $R_4$ at 8-position is hydrogen, it is deemed that the novel compound exists as a ketoenol type tautomere concerned with the oxygen at 5-position. It should be understood that formula (IV) includes such a case.

Further, in this invention it is possible to convert a compound shown by said formula (IV) to another compound shown by the same formula. Hereinbelow, the main modes of practice will be explained.

1. Of the objective compound (IV) of this invention, a compound whose $R_1$ is hydrogen, viz. 6-position is occupied by a free carboxylic acid may be easily obtained by hydrolyzing a compound whose $R_1$ is a lower alkyl, viz. 6-position is occupied by an ester with an alkali saponifier or an acid saponifier.

As such known saponifiers, a caustic alkali or an alkali carbonate such as sodium hydroxide, potassium hydroxide and sodium carbonate and mineral acids such as hydrochloric acid, sulfuric acid and phosphoric acid may be cited. When an alkali saponifier is used, caustic alkalis are preferable to alkali carbonates in the capacity of hydrolysis.

As a hydrolysis reaction, it is sufficient to heat said compound with these alkalis or acids for a short period. Adaption of an excessively high temperature and/or an excessively long heating period is undesirable because of the tendency to bring about a side reaction. Generally, heating at a temperature below 100°C. for several minutes will do.

Upon converting a compound of which $R_1$ is a lower alkyl in formula (IV) to another compound of which $R_1$ is hydrogen by this hydrolysis, when $R_4$ is a lower alkyl and $R_3$ is a lower alkoxy radical, a lower alkylthio radical or a radical represented by the formula

[wherein R' and R'' are as defined in the formula (IV)], the substituent at 2-position, viz. $R_3$ is hydrolyzed simultaneously with $R_1$ and converted to a hydroxyl group.

Also, it is possible to hydrolyze a compound whose $R_1$ is hydrogen atom, namely 6-position is occupied by a free carboxylic acid, whose $R_4$ is a lower alkyl radical, and whose $R_3$ is a lower alkoxy radical, a lower alkylthio radical or a radical represented by the formula

[wherein R' and R'' are as defined in the formula (IV)] in the formula (IV) and convert said substituent at 2-position to a hydroxyl group.

When a reaction to convert a compound of the formula (IV) to another compound of the same formula utilizing hydrolysis as mentioned above is shown by formulas, it can be shown as follows.

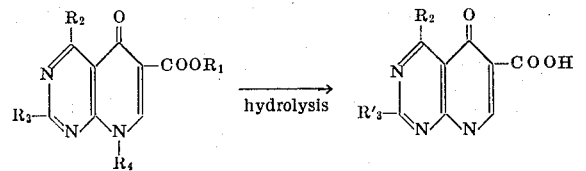

(wherein $R'_3$ stands for a hydroxyl group when $R_3$ stands for a lower alkoxy, a lower alkylthio or

(wherein R' and R'' are as mentioned above), and $R_4$ is an alkyl radical, otherwise $R'_3$ is same as $R_3$ while $R_1$, $R_2$, $R_3$ and $R_4$ are as defined above.)

2. Of the objective compound (IV) of this invention, an compound whose $R_4$ is an alkyl, namely, 8-position is substituted by an alkyl may be easily obtained from a compound whose $R_4$ is hydrogen by utilizing a known alkylation.

This reaction of converting a compound of the formula (IV) to another compound of the same formula (IV) but utilizing alkylation can be shown by the following formula.

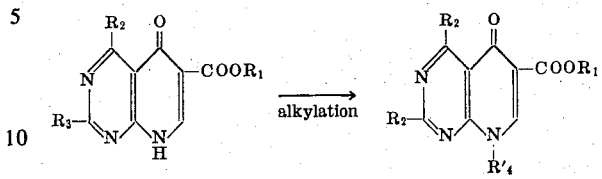

(wherein $R_1$, $R_2$, $R_3$ and $R_4$ are as defined in the formula (IV) and $R'_4$ stands for a lower alkyl).

This alkylation may be carried out by using a known alkylating agent, for instance, an alkyl halide, a dialkyl sulfate and an alkyl sulfonate. The reaction may be carried out by merely containing said compound whose $R_4$ is hydrogen with these alkylating agents. When, for instance, a dialkyl sulfate or an alkyl sulfonate is used, the reaction proceeds merely by stirring. When an alkyl halide is used, normally it is better to carry out the reaction by heating.

Normally, it is better to carry out the reaction in water or an organic solvent inert to the reaction system such as, for instance, water, dimethylformamide and aliphatic alcohols in which a compound whose $R_4$ is hydrogen may be able to dissolve or suspend. As mentioned above, the reaction may be carried out at room temperature or under heating conditions. Normally, as the heating temperature about 100° C. is suitable.

This conversion of a compound whose $R_4$ is hydrogen to a compound whose $R_4$ is an alkyl may be more accelerated by adding an alkali substance such as, for instance, potassium carbonate to the reaction system. When a compound whose $R_4$ is hydrogen and whose $R_1$ is a lower alkyl compound is alkylated by the use of a strong alkali such as, for instance, a caustic alkali like sodium hydroxide or potassium hydroxide as an alkali substance, sometimes $R_1$ is simultaneously hydrolyzed and said compound is converted to another compound whose $R_1$ is hydrogen, viz. 6-position is occupied by a free carboxylic acid.

3. Further, of the objective compound (IV) of this invention, an amino substituent whose $R_3$ is

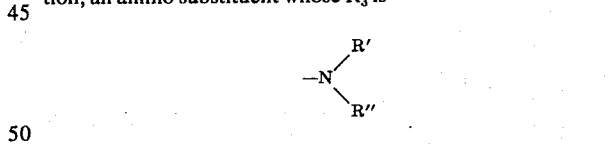

[wherein R' and R'' are as defined in the formula (IV)] can be obtained by reaction of amines of the formula

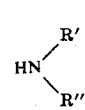

(wherein R' and R'' are as mentioned above) with a compound of the formula (IV) whose $R_3$ is a lower alkoxy radical or a lower alkylthio radical.

When this reaction of converting a compound of the formula (IV) to another compound of the same formula (IV) by utilizing said amination is shown by formulas, it can be shown as follows.

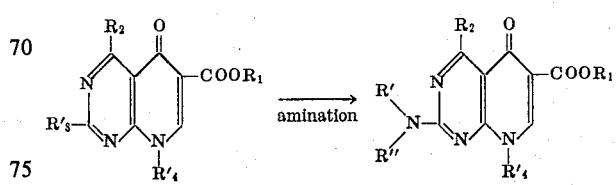

(wherein $R_1$, $R_2$, $R'$ and $R''$ are as defined in the formula (IV), $R'_3$ stands for a lower alkoxy radical or a lower alkylthio radical, and $R'_4$ stands for an alkyl radical).

This amination is normally carried out in a solvent. As such solvent, an solvent inert to the reaction system under the reaction conditions such as, for instance, water, aliphatic alcohols, benzene, toluene, xylene, halogenoalkanes, tetrahydrofuran and dioxane may be cited. The reaction proceeds at room temperature also; however, preferably it is better to carry out the reaction at a temperature of 50°–150° C. under the heating conditions. Moreover, the reaction may be carried out under atmosphere or pressure; however, it is better to carry out the reaction under a pressure, for instance 2–10 atmospheres.

4. Of the objective compound (IV) of this invention, a compound whose $R_3$ is hydrogen is obtainable from another compound of the formula (IV) whose $R_3$ is a lower alkylthio by desulfurization.

This reaction of converting a compound of the formula (IV) to another compound of the same formula (IV) by utilizing desulfurization can be shown by the following formulas.

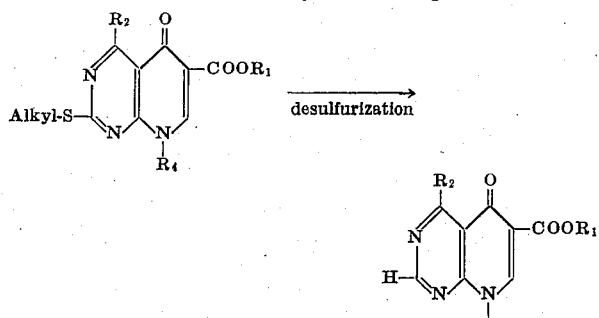

[wherein $R_1$, $R_2$ and $R_4$ are as defined in the formula (IV)].

This reaction may be carried out in a proper inert solvent such as alcohols and dioxane at a temperature of 50°–200° C. in the presence of a metal catalyst such as Raney nickel.

Thus, in the process of this invention, as mentioned above the objective novel compound of a 5,8-dihydro-5-oxopyrido [2,3-d] pyrimidine derivative is obtained by ring-closing upon heating the novel compound of the formula (III) of an N-(6-pyrimidinyl) aminomethylene malonic acid derivative formed by reaction of the compound of the formula (I) with the compound of the formula (II) or reaction of the compound of the formula (I') with the compound of the formula (II'). Further, if desired as mentioned in the aforesaid (1)–(4), it is possible to obtain the objective product by converting a compound of the formula (IV) to another compound represented by the same formula (IV).

Accordingly, the process of this invention contains processes for preparing the compound of the formula (III), a process for preparing the compound of the formula (IV) and processes for converting the compound of the formula (IV) to another compound represented by the compound of the same formula (IV) and obtaining the objective compound by properly combining these processes.

Next, a few examples of the novel compound of this invention of a 5,8-dihydro-5-oxopyrido [2,3-d] pyrimidine derivative will be shown in Table II below. However, the compound of (1)–(6), (51), (52) and (54) are illustrations of the intermediate which will become the objective compounds by ring-closing upon heating.

TABLE II

| No. | Compound | Structure | M.P. °C. |
|---|---|---|---|
| 1 | Ethyl-N-(2,4-dimethyl-6-pyrimidinyl)aminomethylenemalonate. |  | 102–103 |
| 2 | Ethyl N-(2-hydroxy-4-pyrimidinyl)aminomethylenemalonate. |  | 191–194 |
| 3 | Ethyl N-(4-methyl-6-pyrimidinyl)aminomethylenemalonate. |  | 101.5–102 |
| 4 | Ethyl N-(4-hydroxy-2-methylthio-6-pyrimidinyl)aminomethylenemalonate. |  | 228–230 |
| 5 | Ethyl N-(4-chloro-2-methylthio-6-pyrimidinyl)aminomethylenemalonate. |  | 132–134 |

TABLE II—Continued

| No. | Compound | Structure | M.P. °C. |
|---|---|---|---|
| 6 | Ethyl N-(2-dimethylamino-4-pyrimidinyl)aminomethylenemalonate. | | 64–65 |
| 7 | 5,8-dihydro-2,4-dimethyl-6-ethoxycarbonyl-5-oxopyrido [2,3-d] pyrimidine. | | 266–7 |
| 8 | 5,8-dihydro-6-ethoxycarbonyl-2-methylthio-5-oxopyrido [2,3-d]pyrimidine. | | 269–271 |
| 9 | 5,8-dihydro-6-ethoxycarbonyl-8-ethyl-2-methylthio-5-oxopyrido [2,3-d]pyrimidine. | | 144.5–145.5 |
| 10 | 5,8-dihydro-6-ethoxycarbonyl-2-methoxy-5-oxopyrido[2,3-d] pyrimidine. | | 235–7 |
| 11 | 5,8-dihydro-6-ethoxycarbonyl-8-ethyl-2-methoxy-5-oxopyrido [2,3-d]pyrimidine. | | 147–9 |
| 12 | 5,8-dihydro-2-dimethylamino-6-ethoxycarbonyl-8-ethyl-5-oxopyrido[2,3-d]pyrimidine. | | 163–164.5 |
| 13 | 5,8-dihydro-6-ethoxycarbonyl-2-hydroxy-5-oxopyrido[2,3-d] pyrimidine. | | 258–261 |
| 14 | 5,8-dihydro-2,4-dimethyl-6-ethoxycarbonyl-8-ethyl-5-oxopyrido[2,3-d]pyrimidine. | | 156.5–158 |
| 15 | 5,8-dihydro-2-dimethylamino-6-ethoxycarbonyl-5-oxopyrido [2,3-d]pyrimidine. | | 290–295 |

TABLE II – Continued

| No. | Compound | Structure | M.P. ° C. |
|---|---|---|---|
| 16 | 5,8-dihydro-6-ethoxycarbonyl-4-hydroxy-2-methylthio-5-oxo-pyrido[2,3-d]pyrimidine. | | 261–263 |
| 17 | 6-carboxy-5,8-dihydro-2,4-dimethyl-8-ethyl-5-oxopyrido[2,3-d]pyrimidine. | | 222–224 |
| 18 | 6-carboxy-5,8-dihydro-2,4-dimethyl-5-oxopyrido[2,3-d]pyrimidine. | | 266–7 |
| 19 | 6-carboxy-5,8-dihydro-8-ethyl-2-hydroxy-5-oxopyrido[2,3-d]pyrimidine. | | 287–292 |
| 20 | 6-carboxy-5,8-dihydro-8-ethyl-2-methylthio-5-oxopyrido[2,3-d]pyrimidine. | | 253–256 |
| 21 | 6-carboxy-5,8-dihydro-8-ethyl-2-methylamino-5-oxopyrido[2,3-d]pyrimidine. | | 274–6 |
| 22 | 2-amino-6-carboxy-5,8-dihydro-8-ethyl-5-oxopyrido[2,3-d]pyrimidine. | | 291–293 |
| 23 | 6-carboxy-5,8-dihydro-2-methylthio-5-oxopyrido[2,3-d]pyrimidine. | | 279–281 |
| 24 | 6-carboxy-5,8-dihydro-8-ethyl-2-methoxy-5-oxopyrido[2,3-d]pyrimidine. | | 254–6 |
| 25 | 6-carboxy-5,8-dihydro-8-ethyl-2-morpholino-5-oxopyrido[2,3-d]pyrimidine. | | 270–272 |

TABLE II – Continued

| No. | Compound | M.P. °C. |
|---|---|---|
| 26 | 6-carboxy-5,8-dihydro-8-ethyl-5-oxo-2-piperidino-pyrido[2,3-d]pyrimidine. | 267–270 |
| 27 | 6-carboxy-5,8-dihydro-8-ethyl-2-(2-hydroxyethyl)amino-5-oxopyrido[2,3-d]pyrimidine. | 268–270 |
| 28 | 6-carboxy-5,8-dihydro-8-ethyl-5-oxo-2-pyrrolidino-pyrido[2,3-d]pyrimidine. | 314–6 |
| 29 | 6-carboxy-5,8-dihydro-8-ethyl-2-isopropylamino-5-oxopyrido[2,3-d]pyrimidine. | 233–235 |
| 30 | 6-carboxy-5,8-dihydro-2-dimethylamino-8-ethyl-5-oxopyrido[2,3-d]pyrimidine. | 288–291 |
| 31 | 6-carboxy-5,8-dihydro-8-ethyl-5-oxopyrido[2,3-d]pyrimidine. | 219–222 |
| 32 | 6-carboxy-2-cyclohexylamino-5,8-dihydro-8-ethyl-5-oxopyrido[2,3-d]pyrimidine. | 209–211 |
| 33 | 6-carboxy-5,8-dihydro-8-ethyl-2-n-hexylamino-5-oxopyrido[2,3-d]pyrimidine. | 164–6 |
| 34 | 2-n-butylamino-6-carboxy-5,8-dihydro-8-ethyl-5-oxopyrido[2,3-d]pyrimidine. | 192–194 |
| 35 | 6-carboxy-2-[3-(diethylamino)propylamino]-5,8-dihydro-8-ethyl-5-oxopyrido[2,3-d]pyrimidine. | 160–162 |

TABLE II—Continued

| No. | Compound | Structure | M.P. °C. |
|---|---|---|---|
| 36 | 6-carboxy-5,8-dihydro-2-[3-(dimethylamino)propylamino]-8-ethyl-5-oxopyrido[2,3-d]pyrimidine. | | 165–7 |
| 37 | 6-carboxy-5,8-dihydro-8-ethyl-2-ethylamino-5-oxopyrido[2,3-d]pyrimidine. | | 269–272 |
| 38 | 6-carboxy-5,8-dihydro-8-methyl-2-methylthio-5-oxopyrido[2,3-d]pyrimidine. | | 299–302 |
| 39 | 6-carboxy-5,8-dihydro-2-dimethylamino-8-methyl-5-oxopyrido[2,3-d]pyrimidine. | | 312–315 |
| 40 | 6-carboxy-5,8-dihydro-2-methylthio-5-oxo-8-n-propyl-pyrido[2,3-d]pyrimidine. | | 197–9 |
| 41 | 8-n-butyl-6-carboxy-5,8-dihydro-2-methylthio-5-oxopyrido[2,3-d]pyrimidine. | | 174–6 |
| 42 | 6-carboxy-5,8-dihydro-8-isopropyl-2-methylthio-5-oxopyrido[2,3-d]pyrimidine. | | 231–233 |
| 43 | 8-n-butyl-6-carboxy-5,8-dihydro-2-dimethylamino-5-oxopyrido[2,3-d]pyrimidine. | | 205–7 |
| 44 | 6-carboxy-5,8-dihydro-2-dimethylamino-5-oxo-8-n-propyl-pyrido[2,3-d]pyrimidine. | | 261–262 |

TABLE II—Continued

| No. | Compound | M.P. °C. |
|---|---|---|
| 45 | 6-carboxy-5,8-dihydro-2-dimethylamino-8-isopropyl-5-oxopyrido[2,3-d]pyrimidine. | 251-253 |
| 46 | 6-carboxy-5,8-dihydro-8-ethyl-2-hydrazino-5-oxopyrido[2,3-d]pyrimidine. | 259-261 |
| 47 | 6-carboxy-5,8-dihydro-2-dodecylamino-8-ethyl-5-oxopyrido[2,3-d]pyrimidine dodecylamine salt. | 160-163 |
| 48 | 6-carboxy-5,8-dihydro-8-ethyl-2-octadecylamino-5-oxopyrido[2,3-d]pyrimidine octadecylamine salt. | 160-163 |
| 49 | 6-carboxy-5,8-dihydro-4-hydroxy-2-methylthio-5-oxopyrido[2,3-d]pyrimidine. | 287-9 |
| 50 | 6-carboxy-5,8-dihydro-2-dimethylamino-5-oxopyrido[2,3-d]pyrimidine. | 300-305 |
| 51 | Ethyl N-(2-methylthio-4-pyrimidinyl) aminomethylenemalonate. | 106-7 |
| 52 | Ethyl N-(2-methoxy-4-pyrimidinyl) aminomethylenemalonate. | 123-125 |
| 53 | 6-carboxy-5,8-dihydro-2-methoxy-5-oxopyrido[2,3-d]pyrimidine. | >250 |
| 54 | Ethyl N-(2-dimethylamino-4-pyrimidinyl)-N-ethyl aminomethylenemalonate. | 148-150 |

The novel compound of this invention of a 5,8-dihydro-5-oxopyrido[2,3-d]pyrimidine derivative has an antibacterial activity against Gram positive, Gram negative bacteria and tubercle bacilli, being useful as a medicine and useful as an intermediate for the preparation of another compound having antibacterial activity.

The following Table III summarizes the in vitro antibacterial activities of the compounds against a variety of microorganisms. The minimum inhibitory concentration (MIC) was determined by well known serial dilution technique.

TABLE III.—ANTIBACTERIAL ACTIVITY IN VITRO
[MIC: mcg./ml.]

| Organism | Compound No. | | | | | | | | | | | | |
|---|---|---|---|---|---|---|---|---|---|---|---|---|---|
| | (20) | (30) | (44) | (21) | (24) | (25) | (26) | (28) | (37) | (39) | (40) | (45) | (47) |
| Staphylococcus aureus | 30 | 10 | 30 | 30 | 30 | 30 | 30 | 10 | 30 | 30 | 30 | 30 | 1 |
| Escherichia coli | 3 | 1 | 3 | 10 | 10 | 3 | 10 | 1 | 10 | 10 | 10 | 10 | 30 |
| Shigella flexneri 2a | 3 | 3 | 10 | 30 | 30 | 10 | 30 | 10 | 10 | 30 | 10 | 10 | 30 |
| Shigella sonnei | 1 | 1 | 3 | 10 | 10 | 3 | 10 | 3 | 10 | 10 | 10 | 10 | 30 |
| Salmonella typhimurium | 3 | 1 | 3 | 10 | 30 | 10 | 10 | 3 | 10 | 10 | 10 | 3 | 10 |
| Proteus vulgaris | 3 | 1 | 3 | 10 | 10 | 3 | 10 | 1 | 3 | 10 | 10 | 10 | 10 |
| Klebsiella pneumoniae | 1 | 0.3 | 1 | 3 | 3 | 1 | 3 | 1 | 1 | 3 | 3 | 3 | 3 |
| Salmonella enteritidis | 1 | 1 | 3 | 10 | 10 | 3 | 10 | 3 | 30 | 10 | 3 | 10 | 30 |
| Mycobacterium tuberculosis | 30 | 10 | 30 | 10 | 30 | 10 | 30 | | 30 | 30 | 10 | 30 | 30 |

The table IV summarizes in vivo activities of the compound against infection with *Salmonella typhimurium* in mice.

TABLE IV.—THERAPEUTIC EFFECT IN MICE (SURVIVED/TESTED)

[Organism: Salmonella typhimurium; Route of infection: i.p.; Route of administration: p.o.]

| | Compound No. | | | |
|---|---|---|---|---|
| | (9) | (12) | (20) | (30) |
| Route | p.o. | p.o. | p.o. | p.o. |
| Dose:[1] | | | | |
| 100 mg./kg | 6/10 | 8/10 | 6/10 | 6/10 |
| 50 mg./kg | 4/10 | 7/10 | 2/10 | 5/10 |
| 25 mg./kg | 1/10 | 5/10 | | 4/10 |
| 12.5 mg./kg | | 3/10 | | 3/10 |

[1] 2 times per day for 4 days.

NOTE.—Survival rate of non-treated control was 0/10.

The 5,8-dihydro-5-oxopyrido[2,3-d]pyrimidine (derivative) of this invention may be used in external, oral and injectable forms or in combination with other drags. Accordingly, this invention contains antibacterial agents having the compound of the formula (IV) as an effective component.

Next, explanations will be made about a few modes of practice of this invention by examples.

EXAMPLE 1

(Example of synthesis of the compound of formula (III) according to method a)

6-Amino-2,4-dimethylpyrimidine (12.2 g.) and 23.0 g of ethyl ethoxymethylene malonate were heated, while stirring, for 35 minutes at a temperature of 110° to 120° C. The resulting product was cooled and recrystallized from ethanol. There was obtained 18.5 g of ethyl N-(2,4-dimethyl-6-pyrimidinyl) aminomethylene malonate having a melting point of 102° to 103°C.

EXAMPLE 2

(Example of synthesis of the compound of formula (III) according to method a)

4-Amino-2-methylthiopyrimidine (29.0 g) and 60.0 g of ethylethoxymethylene malonate were heated, while stirring, for 1 hour and 40 minutes at a temperature of 135° to 140° C. The resulting product was cooled and recrystallized from ethanol. There was obtained 33.7 g of ethyl N-(2-methylthio-6-pyrimidinyl) aminomethylene malonate having a melting point of 106° to 107°C.

EXAMPLE 3

(Example of synthesis of the compound of formula (III) according to method a)

4-Amino-2-methoxypyrimidine (2.06 g) and 4.20 g of ethylethoxymethylene malonate were heated, while stirring, for 1 hour and 10 minutes at a temperature of 135° to 140° C. The resulting product was cooled and recrystallized from ethanol. There was obtained 2.66 g of ethyl N-(2-methoxy-6-pyrimidinyl) aminomethylene malonate having a melting point of 123° to 125°C.

EXAMPLE 4

(Example of synthesis of the compound of formula (III) according to method a)

4-Amino-2-hydroxypyrimidine (1.4 g) and 3.0 g of ethyl ethoxymethylene malonate were subject to reaction for 20 minutes at 150° to 160° C. After cooling the reaction product, the obtained crystals were recrystallized from ethanol. There was obtained 2.4 g of ethyl N-(2-hydroxy-4-pyrimidinyl) amino methylene malonate having a melting point of 191°–194°C.

The following compounds were obtained by the same method as above mentioned.

1. Ethyl N-(4-methyl-6-pyrimidinyl) aminomethylene malonate having a melting point of 101.5°–102° C. from 6-amino-4-methylpyrimidine and ethyl ethoxymethylene malonate.

2. Ethyl N-(4-hydroxy-2-methylthio-6-pyrimidinyl) aminomethylene malonate having a melting point of 228°–230° C. from 6-amino-4-hydroxy-2-methylthio pyrimidine and ethyl ethoxymethylene malonate.

3. Ethyl N-(4-chloro-2-methylthio-6-pyrimidinyl) aminomethylene malonate having a melting point of 132°–134° C. from 6-amino-4-chloro-2-methylthio-pyrimidine and ethyl ethoxymethylene malonate.

4. Ethyl-N-(2-dimethylamino-4-pyrimidinyl) aminomethylene malonate having a melting point of 59°–63° C. from 4-amino-2-dimethylaminopyrimidine and ethyl ethoxymethylene malonate.

EXAMPLE 5

(Example of synthesis of the compound of formula (III) according to method a)

A mixture of 1.0 g of 2-dimethylamino-4-ethylaminopyrimidine and 1.4 g of ethyl ethoxymethylene malonate was stirred for 2 hours at 145° C. and then distilled under reduced pressure. There was obtained 760 mg of ethyl N-(2-dimethylamino-4-pyrimidinyl)-N-ethyl aminomethylene malonate. The picrate of this compound has a melting point of 148°–150° C.

EXAMPLE 6

(Example of synthesis of the compound of formula (III) according to method b)

4-Chloro-2-dimethylamino pyrimidine (200 mg) and 300 mg of ethyl aminomethylene malonate were added to 30 ml of ethanol, and the mixture was reacted for 6 hours at 140° C. in a sealed tube. At the end of the reaction, the solvent was removed by distillation under reduced pressure. The resulting product was recrystallized from ethanol to give 280 mg of ethyl N-(2-dimethylamino-4-pyrimidinyl) aminomethylene malonate having a melting point of 59°–63° C.

The following compounds were obtained in the same manner as above mentioned.

1. Ethyl N-(2-methylthio-4-pyrimidinyl) aminomethylene malonate having a melting point of 106°–107° C. from 4-chloro-2-methylthiopyrimidine and ethyl aminomethylene malonate.

2. Ethyl N-(2-methoxy-4-pyrimidinyl) aminomethylene malonate having a melting point of 123°–125° C. from 4-chloro-2-methoxypyrimidine and ethyl aminomethylene malonate.

EXAMPLE 7

(Example of synthesis of the compound of the formula (IV) from the compound of formula (III))

Ethyl N-(2,4-dimethyl-6-pyrimidinyl) aminomethylene malonate obtained in Example 1 (4.20 g) was added to 60 g of a boiling diphenyl ether, and the mixture was vigorously heated under reflux for 15 minutes. After cooling, 300 ml of n-hexane was added to the product. The precipitated crystals were recovered by filtration and recrystallized from ethanol to give 2.30 g of 5,8-dihydro-2,4-dimethyl-6-ethoxycarbonyl-5-oxopyrido [2,3-d] pyrimidine having a melting point of 266°–267° C.

EXAMPLE 8

(Example of synthesis of the compound of formula (IV) from the compound of formula (III))

Ethyl N-(2-methylthio-6-pyrimidinyl) aminomethylene malonate obtained in Example 2 (43.0 g) was added to 270 ml of boiling diphenyl ether, and the mixture was heated under reflux for 25 minutes. After cooling, 400 ml of n-hexane was added to the product. The precipitated crystals were recovered by filtration and washed with ethanol to give 26.4 g of 5,8-dihydro-6-ethoxycarbonyl-2-methylthio-5-oxopyrido [2,3-d] pyrimidine having a melting point of 269°–271° C.

EXAMPLE 9

(Example of synthesis of the compound of formula (IV) from the compound formula (III))

Ethyl N-(2-methoxy-6-pyrimidinyl) aminomethylene malonate obtained in Example 3 (1.16 g) was added to 15 ml of boiling diphenyl ether, and the mixture was vigorously heated under reflux for 10 minutes. After cooling, 50 ml of n-hexane was added to the product. The precipitated crystals were recovered by filtration and recrystallized from ethanol to give 0.64 g of 5,8-dihydro-6-ethoxycarbonyl-2-methoxy-5-oxopyrido [2,3-d] pyrimidine having a melting point of 235°–237° C.

EXAMPLE 10

(Example of synthesis of the compound of formula (IV) from the compound of formula (III))

Ethyl N-(2-hydroxy-4-pyrimidinyl) aminomethylene malonate (610 mg) was added to 5 ml of boiling diphenyl ether, and the mixture was heated for 10 minutes under reflux. After cooling, 10 ml of n-hexane was added to the product. The precipitated crystals were recovered by filtration, and recrystallized from methanol to give 330 mg of 5,8-dihydro-6-ethoxycarbonyl-2-hydroxy-5-oxopyrido [2,3-d] pyrimidine having a melting point of 258°–261° C.

EXAMPLE 11

(Example of synthesis of the compound of formula (IV) from the compound of formula (III))

Ethyl N-(4-hydroxy-2-methylthio-6-pyrimidinyl) aminomethylene malonate (2.10 mg) was added to 3 ml of diphenyl ether, and the mixture was refluxed for 13 minutes. To the product was added 15 ml of n-hexane. The precipitated crystals were recovered by filtration and recrystallized from ethanol-chloroform to give 20 mg of 5,8-dihydro-6-ethoxycarbonyl-4-hydroxy-2-methylthio-5-oxopyrido [2,3-d] pyrimidine having a melting point of 261°–263° C.

EXAMPLE 12

(Example of synthesis of the compound of formula (IV) from the compound of formula (III))

Ethyl N-(2-dimethylamino-4-pyrimidinyl) aminomethylene malonate (10 g) was added to 50 ml of diphenyl ether under reflux, and the mixture was reacted for 20 minutes. After cooling, 200 ml of n-hexane was added to the product. The precipitated crystals were recovered by filtration, and washed with ethanol to give 8.0 g of 5,8-dihydro-2-dimethylamino-6-ethoxycarbonyl-5-oxopyrido [2,3-d] pyrimidine having a melting point of 290°–295° C.

EXAMPLE 13

(Example of conversion of the compound of formula (IV) by alkylation into another compound of formula (IV))

A mixture of 2.9 g of 5,8-dihydro-2,4-dimethyl-6-ethoxycarbonyl-5-oxopyrido [2,3-d] pyrimidine, 25 g of dimethylformamide, 10 g of ethyl iodide and 10 ml of a 20 percent aqueous solution of potassium carbonate was stirred for 1 hour at 100° C. The precipitated potassium iodide was separated by filtration, and dimethylformamide was removed by distillation under reduced pressure. A saturated aqueous sodium chloride was added to the resulting product, and it was extracted with chloroform, followed by recrystallization from ethanol. There was obtained 1.95 g of 5,8-dihydro-2,4-dimethyl-6-ethoxycarbonyl-8-ethyl-5-oxopyrido [2,3-d] pyrimidine having a melting point of 156.5°–158° C.

EXAMPLE 14

(Example of conversion of the compound of formula (IV) by alkylation into another compound of formula (IV))

A mixture of 0.32 g of 5,8-dihydro-6-ethoxycarbonyl-2-methylthio-5-oxopyrido [2,3-d] pyrimidine, 2.6 g of dimethylformamide, 1.1 g of ethyl iodide and 2 ml of a 20 percent aqueous solution of potassium carbonate was treated in the same manner as in Example 13 to give 0.30 g of 5,8-dihydro-6-ethoxycarbonyl-8-ethyl-2-methylthio-5-oxopyrido [2,3-d] pyrimidine having a melting point of 144.5°–145° C.

EXAMPLE 15

(Example of conversion by alkylation)

A mixture of 100 mg of 5,8-dihydro-6-ethoxycarbonyl-2-methoxy-5-oxopyrido [2,3-d] pyrimidine, 1.0 g of dimethylformamide, 300 ml of ethyl iodide and 1 ml of a 20 percent aqueous solution of potassium carbonate was treated in the same manner as in Example 13. The reaction product was recrystallized from acetone-n-hexane to give 82 mg of 5,8-dihydro-6-ethoxycarbonyl-8-ethyl-2-methoxy-5-oxopyrido [2,3-d] pyrimidine having a melting point of 147°–149° C.

EXAMPLE 16

(Example of conversion by alkylation)

6-Carboxy-5,8-dihydro-2-methylthio-5-oxopyrido [2,3-d] pyrimidine (7.0 g) was dissolved in a 4 percent aqueous solution of potassium hydroxide, and on addition of 5.0 g of diethyl sulphate, the solution was vigorously stirred at room temperature for 2 hours. After having been left to stand overnight, the reaction product was acidified with acetic acid. The precipitated crystals were recovered by filtration, washed with water, and recrystallized from methanol to give 7.2 g of 6-carboxy-5,8-dihydro-8-ethyl-2-methylthio-5-oxopyrido [2,3-d] pyrimidine having a melting point of 253°–256° C.

EXAMPLE 17

(Example of conversion by alkylation)

6-Carboxy-5,8-dihydro-2-methoxy-5-oxopyrido [2,3-d] pyrimidine (100 mg) was dissolved in 5 ml of a 4 percent aqueous solution of potassium hydroxide, and on addition of diethyl sulphate, the solution was treated in the same manner as in Example 16. The resulting product was recrystallized from chloroform-acetone to give 98 mg of 6-carboxy 5,8-dihydro-8-ethyl-2-methoxy-5-oxopyrido [2,3-d] pyrimidine having a maleing point of 254°–256° C.

EXAMPLE 18

(Example of conversion by alkylation)

6-Carboxy-5,8-dihydro-2-methylthio-5-oxopyrido [2,3-d] pyrimidine (1.54 g) was dissolved in 30 ml of a 4 percent aqueous solution of potassium hydroxide. Two grams of dimethyl sulphate was added to the resulting solution while cooling, and the mixture was stirred for 4 hours. After having been left to stand overnight, the resulting product was acidified with acetic acid. The precipitated crystals were recovered by filtration, and recrystallized from a great quantity methanol-chloroform. There was obtained 1.10 g of 6-carboxy-5,8-dihydro-8-methyl-2-methylthio-5-oxopyrido [2,3-d] pyrimidine having a melting point of 299°–302° C.

EXAMPLE 19

(Example of conversion of alkylation)
5,8-Dihydro-6-ethoxycarbonyl-2-methylthio-5-oxopyrido [2,3-d] pyrimidine (200 mg) was suspended in 10 ml of ethanol-water (1:1) containing 0.4 g of potassium hydroxide, and on addition of 500 mg of diethyl sulphate, the suspension was stirred for 4 hours while cooling. After having been left to stand overnight, the product was acidified with acetic acid. The precipitated crystals were recovered by filtration, and recrystallized from chloroform to give 108 mg of 6-carboxy-5,8-dihydro-8-ethyl-2-methylthio-5-oxopyrido- [2,3-d] pyrimidine having a melting point of 253°–255° C.

EXAMPLE 20

(Example of conversion by alkylation)
The following compounds were obtained in the same manner as in Example 19.
1. 6-Carboxy-5,8-dihydro-2-methylthio-5-oxo-8-n-propyl-pyrido [2,3-d] pyrimidine having a melting point of 197°–199° C.
2. 8-N-butyl-6-carboxy-5,8-dihydro-2-methylthio-5-oxopyrido [2,3-d] pyrimidine having a melting point of 174°–176° C.
3. 6-Carboxy-5,8-dihydro-8-isopropyl-2-methylthio-5-oxopyrido [2,3-d] pyrimidine having a melting point of 231–233°C.

EXAMPLE 21

(Example of conversion by hydrolysis)
5,8-Dihydro-6-ethoxycarbonyl-2-methylthio-5-oxopyrido [2,3-d] pyrimidine (20.0 g) was added to 200 ml of a 7 percent aqueous solution of sodium hydroxide, and the solution was heated for 20 minutes at 100° C. The product was acidified with acetic acid. The precipitated crystals were recovered by filtration and recrystallized from a great quantity of methanol to give 12.5 g of 6-carboxy-5,8-dihydro-2-methylthio-5-oxopyrido [2,3-d] pyrimidine having a melting point of 279°–281° C.

EXAMPLE 22

(Example of conversion by hydrolysis)
5,8-Dihydro-6-ethoxycarbonyl-2-methoxy-5-oxopyrido [2,3-d] pyrimidine (400 mg) was added to 8 ml of a 5 percent aqueous solution of sodium hydroxide, and the solution was heated for 15 minutes at 90° C. The resulting product was acidified with acetic acid. The precipitated crystal were recovered by filtration, and recrystallized from a great quantity of methanol-acetone to give 290 mg of 6-carboxy-5,8-dihydro-2-methoxy-5-oxopyrido [2,3-d] pyrimidine having a melting point of above 250° C.

EXAMPLE 23

(Example of conversion by hydrolysis)
5,8-Dihydro-2,4-dimethyl-6-ethoxycarbonyl-8-ethyl-5-oxopyrido [2,3-d] pyrimidine (1.2 g) was added to 15 ml of a 10 percent aqueous solution of sodium hydroxide, and the solution was heated for 1 hour and 30 minutes at 125° C. The resulting product was acidified with acetic acid. The precipitated crystals were recovered by filtration, and recrystallized from ethanol to give 0.77 g of 6-carboxy-5,8-dihydro-2,4-dimethyl-8-ethyl-5-oxopyrido [2,3-d] pyrimidine having a melting point of 222°–224° C.

EXAMPLE 24

(Example of conversion of hydrolysis)
5,8-Dihydro-2,4-dimethyl-6-ethoxycarbonyl-5-oxopyrido [2,3-d] pyrimidine (165 mg) was added to 8ml of a 10 percent aqueous solution of sodium hydroxide, and the solution was heated for 1 hour and 30 minutes at 120°–130° C. The resulting product was acidified with acetic acid. The precipitated crystals were recovered by filtration, and recrystallized from ethanol to give 109 mg of 6-carboxy-5,8-dihydro-2,4-dimethyl-5-oxopyrido [2,3-d] pyrimidine having a melting point of 266°–267° C.

EXAMPLE 25

(Example of conversion by hydrolysis)
6-Carboxy-5,8-dihydro-8-ethyl-2-methylthio-5-oxopyrido [2,3-d] pyrimidine (47 mg) was added to 1 ml of a 5 percent caustic soda, and the mixture was heated for 15 minutes at 90°–95 c. After cooling, the resulting product was acidified with acetic acid. The precipitated crystals were recovered by filtration and recrystallized from a great quantity of ethanol to give 31 mg of 6-carboxy-5,8-dihydro-8-ethyl-2-hydroxy-5-oxopyrido [2,3-d] pyrimidine having a melting point of 287°–292° C.

EXAMPLE 26

(Example of conversion by hydrolysis)
5.8-Dihydro-6-ethoxycarbonyl-8-ethyl-2-methoxy-5-oxopyrido [2,3-d] pyrimidine (50 mg) was added to 1 ml of a 5 percent caustic soda, and the mixture was heated for 5 minutes at 95° C. The subjection of the resulting product to the same treatment as in Example 25 gave 33 mg of 6-carboxy-5,8-dihydro-8-ethyl-2-hydroxy-5-oxopyrido [2,3-d] pyrimidine.

EXAMPLE 27

(Example of conversion by hydrolysis)
5,8-Dihydro-6-ethoxycarbonyl-8-ethyl-2-methylthio-5-oxopyrido [2,3-d] pyrimidine (200 mg) was added to 4 ml of a 5 percent caustic soda, and the mixture was heated for 15 minutes at 90°–95° C. The subjection of the resulting product to the same treatment as in Example 25 gave 123 mg of 6-carboxy-5,8-dihydro-8-ethyl-2-hydroxy-5-oxopyrido [2,3-d] pyrimidine.

EXAMPLE 28

(Example of conversion by hydrolysis)
Five hundred milligrams of 5,8-dihydro-6-ethoxycarbonyl-4-hydroxy-2-methylthio-5-oxopyrido [2,3-d] pyrimidine was added to 10 ml of a 7 percent caustic soda, and the mixture was heated for 13 minutes at 90° C for hydrolysis. The product was acidified with acetic acid. The precipitated crystals were recovered by filtration, and recrystallized from methanol-chloroform to give 370 mg of 6-carboxy-5,8-dihydro-4-hydroxy-2-methylthio-5-oxopyrido [2,3-d] pyrimidine having a melting point of 287°–289° C.

EXAMPLE 29

(Example of conversion by hydrolysis)
5,8-Dihydro-2-dimethylamino-6-ethoxycarbonyl-5-oxopyrido [2,3-d] pyrimidine (7.0 g) was added to 100 ml of a 7 percent caustic soda, and the mixture was heated for 30 minutes at 140° C. for hydrolysis. The product was acidified with acetic acid. The precipitated crystals were recovered by filtration, and recrystallized from acetonitrile. There was obtained 5.6 g of 6-carboxy-5,8-dihydro-2-dimethylamino-5-oxopyrido [2,3-d] pyrimidine having a melting point of 300°–303° C.

EXAMPLE 30

(Example of conversion of the compound of formula (IV) by amination into another compound of formula (IV).)

Seven hundred milligrams of 5,8-dihydro-6-ethoxycarbonyl-8-ethyl-2-methylthio-5-oxopyrido [2,3-d] pyrimidine was added to 30 ml of absolute ethanol containing 2 g of dimethylamine, and the mixture was heated in a sealed tube for 6 hours at 95° C. The solvent was removed by distillation, and the residue was recrystallized from ethanol. There was obtained 560 mg of 5,8-dihydro-2-dimethylamino-6-ethoxycarbonyl-8-ethyl-5-oxopyrido [2,3-d] pyrimidine having a melting point of 163°–164.5° C.

EXAMPLE 31

(Example of conversion by amination)

Seven hundred milligrams of 6-carboxy-5,8-dihydro-8-ethyl-2-methylthio-5-oxopyrido [2,3-d] pyrimidine was treated in quite the same manner as in Example 30. There was obtained 530 mg of 6-carboxy-5,8-dihydro-2-dimethylamino-8-ethyl-5-oxopyrido [2,3-d] pyrimidine having a melting point of 288°–291° C.

EXAMPLE 32

(Example of conversion by amination)

One hundred and fifty milligrams of 6-carboxy-5,8-dihydro-8-ethyl-2-methylthio-5-oxopyrido [2,3-d] pyrimidine was added to 30 ml of absolute ethanol. Into this mixture was dissolved 2.0 g of methylamine, and the solution was heated for 7 hours at 105° C. in a sealed tube. The solvent was removed by distillation, and the residue was washed with ethanol and recrystallized from methanol-chloroform. There was obtained 120 mg of 6-carboxy-5,8-dihydro-8-ethyl-2-methylamino-5-oxopyrido [2,3-d] pyrimidine having a melting point of 274°–276° C.

When in this example the same treatment was carried out with the use of n-butylamine, n-hexylamine, isopropylamine, cyclohexylamine, ethanolamine, diethylaminopropylamine, dimethylaminopropylamine and ethylamine in place of methylamine, the following compounds were obtained.
1. 2-N-butylamino-6-carboxy-5,8-dihydro-8-ethyl-5-oxopyrido [2,3-d] pyrimidine (126 mg; m.p. 192°–194° C.)
2. 6-Carboxy-5,8-dihydro-8-ethyl-2-n-hexylamino-5-oxopyrido [2,3-d] pyrimidine (137 mg; m.p. 164°–166° C.)
3. 6-Carboxy-5,8-dihydro-8-ethyl-2-isopropylamino-5-oxopyrido [2,3-d] pyrimidine (124 mg; m.p. 233°–235° C.)
4. 6-Carboxy-2-cyclohexylamino-5,8-dihydro-8-ethyl-5-oxopyrido [2,3-d] pyrimidine (131 mg; m.p. 209°–211° C.)
5. 6-Carboxy-5,8-dihydro-8-ethyl-2-(2-hydroxyethyl)amino-5-oxopyrido [2,3-d] pyrimidine (118 mg; m.p. 268°–270° C.)
6. 6-Carboxy-2-[3-(diethylamino) propylamino]-5,8-dihydro-8-ethyl-5-oxopyrido [2,3-d] pyrimidine (142 mg; m.p. 160°–162° C.)
7. 6-Carboxy-2-[3-(dimethylamino) propylamino]-8-ethyl-5-oxopyrido [2,3-d] pyrimidine (135 mg; m.p. 165°–167° C.)
8. 6-Carboxy-5,8-dihydro-8-ethyl-2-ethylamino-5-oxopyrido [2,3-d] pyrimidine (107 mg; m.p. 269°–272° C.)

EXAMPLE 33

(Example of conversion by amination)

Two hundred milligrams of 6-carboxy-5,8-dihydro-8-ethyl-2-methylthio-5-oxopyrido [2,3-d] pyrimidine was added to 30 ml of absolute ethanol containing 1.2 g of ammonia, and the mixture was reacted for 5.5 hours at 105° C. in a sealed tube. The solvent was removed by distillation, and the residue was recrystallized from ethanol to give 127 mg of 2-amino-6-carboxy-5,8-dihydro-8-ethyl-5-oxopyrido [2,3-d] pyrimidine having a melting point of 291°–293° C.

EXAMPLE 34

(Example of conversion by amination)

One hundred and fifty milligrams of 6-carboxy-5,8-dihydro-8-ethyl-2-methylthio-5-oxopyrido [2,3-d] pyrimidine was added to 30 ml of absolute ethanol containing 1.1 g of piperidine had been dissolved, and the mixture was reacted for 5 hours at 95° C. in a sealed tube. The solvent was removed by distillation, and the residue was recrystallized from methanol-chloroform. There was obtained 112 mg of 6-carboxy-5,8-dihydro-8-ethyl-5-oxo-2-piperidino-pyrido [2,3-d] pyrimidine having a melting point of 267°–270° C.

EXAMPLE 35

(Example of conversion by amination)

When morpholine was used instead of piperidine in Example 34, there was obtained 121 mg of 6-carboxy-5,8-dihydro-8-ethyl-2-morpholino-5-oxopyrido [2,3-d] pyrimidine having a melting point of 270°–272° C.

EXAMPLE 36

(Example of conversion by amination)

When pyrrolidine was used instead of piperidine in Example 34, there was obtained 111 mg of 6-carboxy-5,8-dihydro-8-ethyl-5-oxo-2-pyrrolidinopyrido [2,3-d] pyrimidine having a melting point of 314°–316° C.

EXAMPLE 37

(Example of conversion by amination)

Two hundred milligrams of 6-carboxy-5,8-dihydro-8-methyl-2-methylthio-5-oxopyrido [2,3-d] pyrimidine was suspended in 30 ml of absolute ethanol containing 6 g of dimethylamine, and the suspension was reacted for 6 hours at 105° C. in a sealed tube. The product was heated and filtered. The solvent was removed by distillation from the filtrate, and the residue was recrystallized from chloroform-methanol. There was obtained 124 mg of 6-carboxy-5,8-dihydro-2-dimethylamino-8-methyl-5-oxopyrido [2,3-d] pyrimidine having a melting point of 312°–315° C.

EXAMPLE 38

(Example of conversion by amination)

The following compounds were obtained in the same manner as in Example 37.
1. 8-N-butyl-6-carboxy-5,8-dihydro-2-dimethylamino-5-oxypyrido [2,3-d] pyrimidine having a melting point of 205°–207° C.
2. 6-Carboxy-5,8-dihydro-2-dimethylamino-5-oxo-8-n-propylpyrido [2,3-d] pyrimidine having a melting point of 261°–262° C.
3. 6-Carboxy-5,8-dihydro-2-dimethylamino-8-isopropyl-5-oxo-pyrido [2,3-d] pyrimidine having a melting point of 251°–253° C.

EXAMPLE 39

(Example of conversion by amination)

Two hundred milligrams of 6-carboxy-5,8-dihydro-8-ethyl-2-methyl-5-oxopyrido [2,3-d] pyrimidine and 100 mg of hydrazine were added to 40 ml of ethanol, and the mixture was heated for 15 minutes under reflux. The precipitated crystals were recovered by filtration, and after washing with ethanol, they were suspended in water. Three to five drops of a 10 percent hydrochloric acid were added to the suspension, and the crystals were dissolved. The resulting solution was filtered. The filtrate was made alkaline with potassium carbonate, and then acidified with acetic acid. The precipitated crystals were recovered by filtration, and recrystallized from methanol. There was obtained 121 mg of 6-carboxy-5,8-dihydro-8-ethyl-2-hydrazino-5-oxopyrido [2,3-d] pyridine having a melting point of 259°–261° C.

EXAMPLE 40

(Example of conversion by amination)

6-Carboxy-5,8-dihydro-8-ethyl-2-methylthio-5-oxopyrido [2,3-d] pyrimidine (200 mg) and 1.0 g of dodecylamine were added to 30 ml of ethanol, and the mixture was reacted for 6 hours at 105° C. in a sealed tube. At the end of the reaction, the solvent was removed by distillation, and the obtained residue was recrystallized from ethanol. There was obtained 285 mg of a dodecylamine salt of 6-carboxy-5,8-dihydro-2-dodecylamino-8-ethyl-5-oxopyrido [2,3-d] pyrimidine having a melting point of 160°–163° C.

EXAMPLE 41

(Example of conversion by amination)

Two hundred milligrams of 6-carboxy-5,8-dihydro-8-ethyl-2-methylthio-5-oxopyrido [2,3-d] pyrimidine and 1.0 g of octadecylamine were added to 30 ml of ethanol, and the mixture was reacted for 6.5 hours at 105° C. in a sealed tube. The solvent was removed by distillation, and the residue was recrystallized from ethanol to give 347 mg of an octadecylamine salt of 6-carboxy-5,8-dihydro-8-ethyl-2-octadecylamino-5-oxopyrido [2,3-d] pyrimidine having a melting point of 160°–163° C.

EXAMPLE 42

(Example of conversion by desulfurization)

Seven hundred milligrams of 6-carboxy-5,8-dihydro-8-ethyl-2-methylthio-5-oxopyrido [2,3-d] pyrimidine was dissolved in 30 ml of dioxane, and on addition of 4 g of Raney nickel (W-4), the solution was refluxed for 3 hours. At the end of the reaction, the Raney nickel was separated by filtration. The filtrate was distilled and the residue was recrystallized from ethanol to give 420 mg of 6-carboxy-5,8-dihydro-8-ethyl-5-oxopyrido [2,3-d] pyrimidine having a melting point of 219°–222° C.

What is claimed is:

1. A 5,8-dihydro-5-oxopyrido [2,3-d] pyrimidine derivative represented by the following formula (IV)

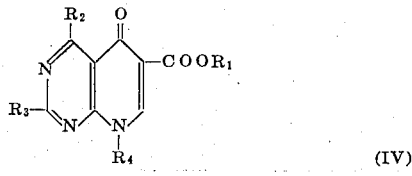

(IV)

wherein $R_1$ stands for hydrogen or a lower alkyl radical; $R_2$ stands for hydrogen, a lower alkyl radical, hydroxyl group, a halogen atom, a lower alkoxy radical, an amino radical or a lower alkylthio radical; $R_3$ stands for a hydroxyl group, a lower alkoxy radical, a lower alkylthio radical or a radical represented by the formula

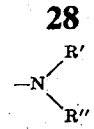

(wherein R' stands for hydrogen, an alkyl radical with up to 18 carbon atoms, cyclohexyl, amino, hydroxyloweralkyl, loweralkylaminoloweralkylene, R'' stands for hydrogen or lower alkyl, and NR' R'' may be morpholino, piperidino, or pyrrolidino); and $R_4$ is hydrogen or a lower alkyl.

2. The 5,8-dihydro-5-oxopyrido [2,3-d] pyrimidine derivative of claim 1 wherein $R_1$ is H; $R_2$ is H; $R_3$ is

wherein R' and R'' are as defined above; and $R_4$ is $C_2H_5$.

3. The 5,8-dihydro-5-oxopyrido [2,3-d] pyrimidine derivative of claim 1 wherein $R_1$ is H; $R_2$ is H; $R_3$ is a lower alkylthio radical; and $R_4$ is $C_2H_5$.

4. The 5,8-dihydro-5-oxopyrido [2,3-d] pyrimidine derivative of claim 1 wherein $R_1$ is H; $R_2$ is H; $R_3$ is a lower alkoxy radical; and $R_4$ is $C_2H_5$.

5. The 5,8-dihydro-5-oxopyrido [2,3-d] pyrimidine derivative of claim 1 wherein $R_1$ is $C_2H_5$; $R_2$ is H; $R_3$ is

wherein R' and R'' are as previously defined; and $R_4$ is $C_2H_5$.

6. The 5,8-dihydro-5-oxopyrido [2,3-d] pyrimidine derivative of claim 1 wherein $R_1$ is H; $R_2$ is H; $R_3$ is a lower alkylthio radical; and $R_4$ is H.

7. The 5,8-dihydro-5-oxopyrido [2,3-d] pyrimidine derivative of claim 1 wherein the compound is 6-carboxy-5,8-dihydro-2-dimethylamino-8-ethyl-5-oxopyrido [2,3-d] pyrimidine.

8. The 5,8-dihydro-5-oxopyrido [2,3-d] pyrimidine derivative of claim 1 wherein the compound is 6-carboxy-5,8-dihydro-8-ethyl-2-morpholino-5-oxopyrido [2,3-d] pyrimidine.

9. The 5,8-dihydro-5-oxopyrido [2,3-d] pyrimidine derivative of claim 1 wherein the compound is 6-carboxy-5,8-dihydro-8-ethyl-5-oxo-2-piperidino-pyrido [2,3-d] pyrimidine.

10. The 5,8-dihydro-5-oxopyrido [2,3-d] pyrimidine derivative of claim 1 wherein the compound is 6-carboxy-5,8-dihydro-8-ethyl-5-oxo-2-pyrrolidino-pyrido [2,3-d] pyrimidine.

* * * * *